United States Patent
Delp

(10) Patent No.: US 9,400,500 B2
(45) Date of Patent: Jul. 26, 2016

(54) AUTONOMOUS VEHICLE REFUELING LOCATOR

(71) Applicant: Toyota Motor Engineering & Manufacturing North America, Inc., Erlanger, KY (US)

(72) Inventor: Michael J. Delp, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/542,444

(22) Filed: Nov. 14, 2014

(65) Prior Publication Data

US 2016/0139600 A1    May 19, 2016

(51) Int. Cl.
| | |
|---|---|
| *B60D 1/04* | (2006.01) |
| *G01F 23/00* | (2006.01) |
| *B60K 35/00* | (2006.01) |
| *G05D 1/02* | (2006.01) |
| *B67D 7/04* | (2010.01) |

(52) U.S. Cl.
CPC .............. *G05D 1/0217* (2013.01); *B60D 1/04* (2013.01); *B60K 35/00* (2013.01); *B67D 7/04* (2013.01); *G01F 23/00* (2013.01); *B60K 2350/1096* (2013.01)

(58) Field of Classification Search
CPC .......... B60K 35/00; B67D 1/04; G01F 23/00; G01F 23/001
USPC ............................................. 701/26, 123, 104
See application file for complete search history.

(56) References Cited

U.S. PATENT DOCUMENTS

| | | | |
|---|---|---|---|
| 5,742,922 A | 4/1998 | Kim | |
| 6,591,185 B1 * | 7/2003 | Polidi | G01C 21/3469 180/69.4 |
| 7,412,313 B2 | 8/2008 | Isaac | |
| 8,116,972 B2 | 2/2012 | Klampfl et al. | |
| 8,504,236 B2 | 8/2013 | Guo et al. | |
| 8,630,791 B2 | 1/2014 | Yuasa | |
| 2006/0293849 A1 * | 12/2006 | Baldwin | G06F 17/30 701/469 |
| 2010/0198508 A1 * | 8/2010 | Tang | G01C 21/3469 701/414 |
| 2013/0226443 A1 | 8/2013 | Scofield et al. | |

* cited by examiner

*Primary Examiner* — Nga X Nguyen
(74) *Attorney, Agent, or Firm* — Christopher G. Darrow; Darrow Mustafa PC

(57) ABSTRACT

An automated driving system can determine, based on input from one or more sensors disposed on an autonomous vehicle, a required fuel level to complete a planned vehicle path and a current fuel level for the autonomous vehicle. If the current fuel level is below the required fuel level, the automated driving system can identify one or more refueling stations and send an indication to a driver of the autonomous vehicle requesting selection of one of the identified refueling stations. If a refueling station selection is received, the automated driving system can update the planned vehicle path to include a stop at the selected refueling station. If a refueling station selection is not received, the automated driving system can determine a critical fuel level. If the current fuel level falls below the critical fuel level, the automated driving system can drive the autonomous vehicle to a proximate refueling station.

19 Claims, 4 Drawing Sheets

AUTONOMOUS VEHICLE REFUELING LOCATOR

BACKGROUND

Drivers of manually controlled vehicles can choose where and when to refuel a vehicle, and applications exist that provide information to the driver about nearby refueling stations, the information including fuel prices and the geographic locations for various refueling stations. Fully or highly automated driving systems are designed to operate a vehicle on the road without driver interaction or other external control, for example, self-driving vehicles or autonomous vehicles. Current automated driving systems are not configured to monitor the fuel or charge level of the autonomous vehicle, detect the location and price of refueling or recharging stations along a planned vehicle path, or modify the planned vehicle path to include a stop at a refueling or recharging station.

SUMMARY

Refueling methods and systems for an autonomous vehicle are described below. The autonomous vehicle can determine the current fuel level and compare this value to a required fuel level to complete a planned vehicle path, based, for example, on the destination programmed for the autonomous vehicle. If the required fuel level is less than the current fuel level, the autonomous vehicle can identify one or more refueling or recharging stations proximate to the planned vehicle path. The autonomous vehicle can then request that the driver or passenger select one of the refueling stations identified, and if a selection is received, the autonomous vehicle can update its planned vehicle path to include a stop at the refueling station. If a refueling station is not selected, the autonomous vehicle can determine a critical fuel level, e.g. a fuel level below which the autonomous vehicle is at risk for running out of fuel, and once the autonomous vehicle's current fuel level falls below the critical fuel level, the autonomous vehicle can be automatically re-routed to a refueling station.

In one implementation, an automated driving system is disclosed. The automated driving system includes one or more sensors disposed on an autonomous vehicle and a computing device in communication with the one or more sensors. The computing device includes one or more processors for controlling operations of the computing device and a memory for storing data and program instructions used by the one or more processors. The one or more processors are configured to execute instructions stored in the memory to: determine a required fuel level to complete a planned vehicle path; determine, based on input from the one or more sensors, a current fuel level for the autonomous vehicle; if the current fuel level is below the required fuel level, identify one or more refueling stations and send an indication to a driver of the autonomous vehicle requesting selection of one of the identified refueling stations; if a refueling station selection is not received from the driver, determine a critical fuel level; and if the current fuel level is below the critical fuel level, send a command to one or more vehicles systems to drive the autonomous vehicle to a proximate refueling station.

In another implementation, a computer-implemented method of automated driving is disclosed. The method includes determining a required fuel level to complete a planned vehicle path; determining, based on input from one or more sensors disposed on an autonomous vehicle, a current fuel level for the autonomous vehicle; if the current fuel level is below the required fuel level, identifying one or more refueling stations and sending an indication to a driver of the autonomous vehicle requesting selection of one of the identified refueling stations; if a refueling station selection is not received from the driver, determining a critical fuel level; and if the current fuel level falls below the critical fuel level, sending a command to one or more vehicles systems to drive the autonomous vehicle to a proximate refueling station.

In another implementation, a computing device is disclosed. The computing device includes one or more processors for controlling operations of the computing device and a memory for storing data and program instructions used by the one or more processors. The one or more processors are configured to execute instructions stored in the memory to: determine a required fuel level to complete a planned vehicle path; determine, based on input from one or more sensors disposed on an autonomous vehicle, a current fuel level for the autonomous vehicle; if the current fuel level is below the required fuel level, identify one or more refueling stations and send an indication to a driver of the autonomous vehicle requesting selection of one of the identified refueling stations; and if a refueling station selection is received, update the planned vehicle path to include a stop at the selected refueling station.

BRIEF DESCRIPTION OF THE DRAWINGS

The description herein makes reference to the accompanying drawings wherein like reference numerals refer to like parts throughout the several views, and wherein.

DETAILED DESCRIPTION

An automated driving system for an autonomous vehicle is disclosed. The autonomous vehicle includes one or more sensors in communication with a fuel system configured to determine the current fuel level for comparison to a required fuel level to traverse a planned vehicle path. If the current fuel level is above the required fuel level, the autonomous vehicle can continue along the planned vehicle path. If not, the autonomous vehicle can identify refueling or recharging stations, for example, proximate to the planned vehicle path and/or based on driver preferences for brand, price, or proximity. The automated driving system can then send an indication to a driver or passenger requesting selection of one of the refueling or recharging stations. If a selection is made, the planned vehicle path is updated to include a stop at the refueling or recharging station. If no selection is made, the automated driving system can determine a critical fuel level, and once the autonomous vehicle's current fuel level falls below the critical fuel level, the autonomous vehicle can be automatically navigated to one of the identified refueling or recharging stations.

Figure 1:
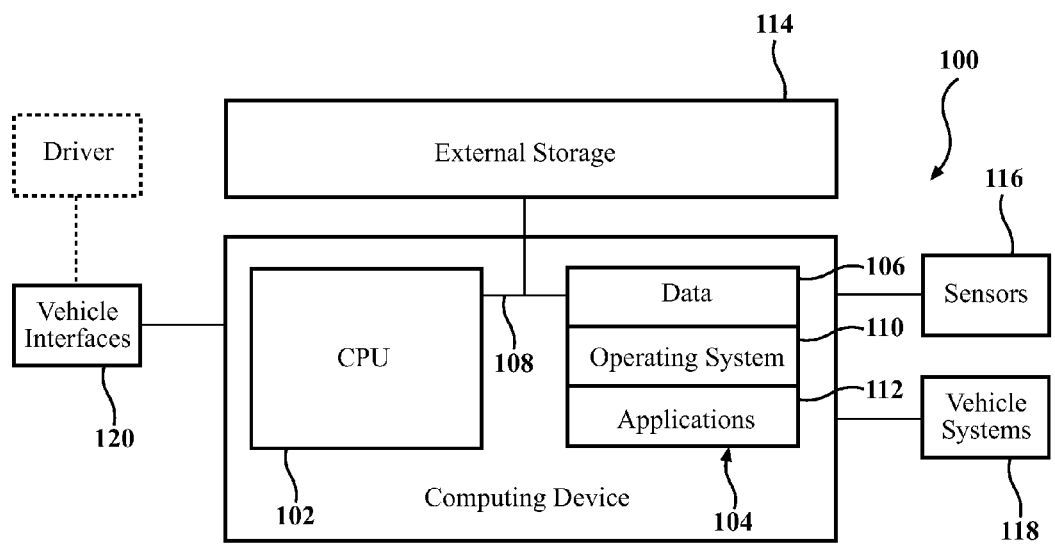
FIG. 1 is a block diagram of a computing device.

FIG. 1 is a block diagram of a computing device 100, for example, for use with an automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with one or more sensors 116. The sensors 116 can capture data and/or signals for processing by an inertial measurement unit (IMU), a dead-reckoning system, a global navigation satellite system (GNSS), a light detection and ranging (LIDAR) system, a radar system, a sonar system, or any other type of system capable of capturing information specific to an autonomous vehicle and the environment surrounding the autonomous vehicle. Information specific to the environment surrounding an autonomous vehicle can include information specific to objects such as other vehicles proximate to a planned vehicle path, pedestrians, obstacles, features of the planned vehicle path being traveled by the autonomous vehicle, or any other localized position data and/or signals that can be captured and sent to the CPU 102 of the computing device 100.

In the examples described below, the sensors 116 can be configured to capture, at least, camera-based images and data for a LIDAR system or other system that measures distance from other vehicles, obstacles, objects, or other geographic features including traffic lights and road signs to allow the autonomous vehicle to traverse a planned vehicle path. The computing device 100 can also be in communication with one or more vehicle systems 118, such as a vehicle fuel system, a vehicle braking system, a vehicle propulsion system, a vehicle steering system, etc. The vehicle systems 118 can also be in communication with the sensors 116, the sensors 116 being configured to capture data indicative of, for example, fuel levels for the autonomous vehicle and other performance characteristics of the various vehicle systems 118.

The computing device 100 can also be coupled to one or more vehicle interfaces 120 configured to receive input from the driver and provide feedback to the driver of the autonomous vehicle. The vehicle interfaces 120 can include, for example, an interactive display. The interactive display can be configured to allow the driver to receive requests from the automated driving system and to send commands to the automated driving system intended to affect the operation of the various vehicle systems 118. Other vehicle interfaces 120, for example, a voice recognition system, could also be configured to receive driver commands regarding operation of the automated driving system.

Figure 2:
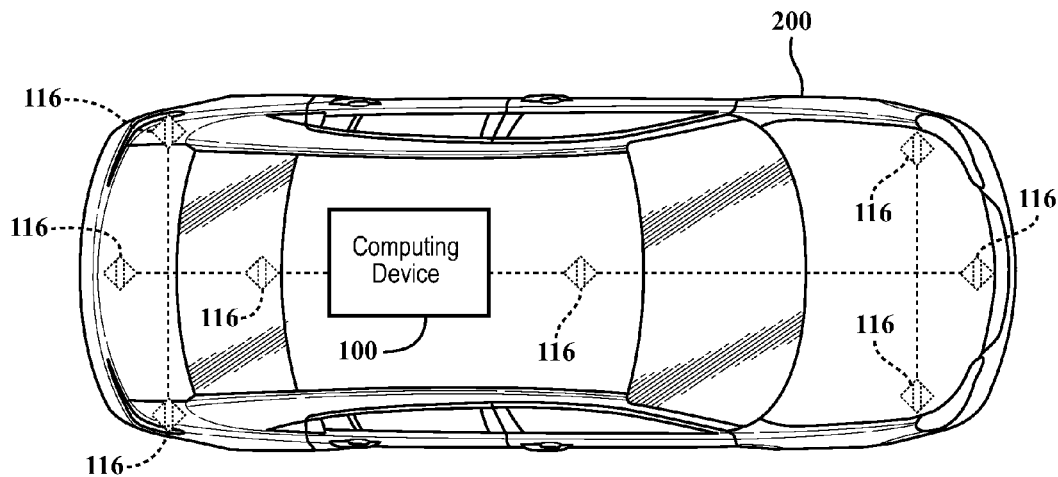
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the autonomous vehicle 200 as shown in FIG. 2 or can be located remotely from the autonomous vehicle 200 in an alternate location (not shown). If the computing device 100 is located remotely from the autonomous vehicle 200, the autonomous vehicle 200 can include the capability of communicating with the computing device 100.

A plurality of sensors 116 in communication with the computing device 100 can be disposed around the perimeter of the autonomous vehicle 200 as shown. One or more of these sensors 116 can be configured to capture images for processing by an image sensor, vehicle position in global coordinates based on signals from a plurality of satellites, the distance to objects within the surrounding environment for use by the computing device 100 to estimate position and orientation of the autonomous vehicle 200 and the objects within the surrounding environment, or any other data and/or signals that could be used to determine the current state of the autonomous vehicle 200 or determine the current state of the surrounding environment.

At least one of the sensors 116 can be in communication with a fuel or power system of the autonomous vehicle 200. When in communication with the fuel or power system, the sensors 116 can be configured to determine the current fuel or charge level, the required fuel or charge level for the autonomous vehicle 200 to traverse a planned vehicle path, and a critical fuel or charge level below which the autonomous vehicle 200 would be at risk for running out of fuel or charge before, for example, reaching either the destination of the planned vehicle path or a refueling or recharging station proximate to the planned vehicle path.

Figure 3:
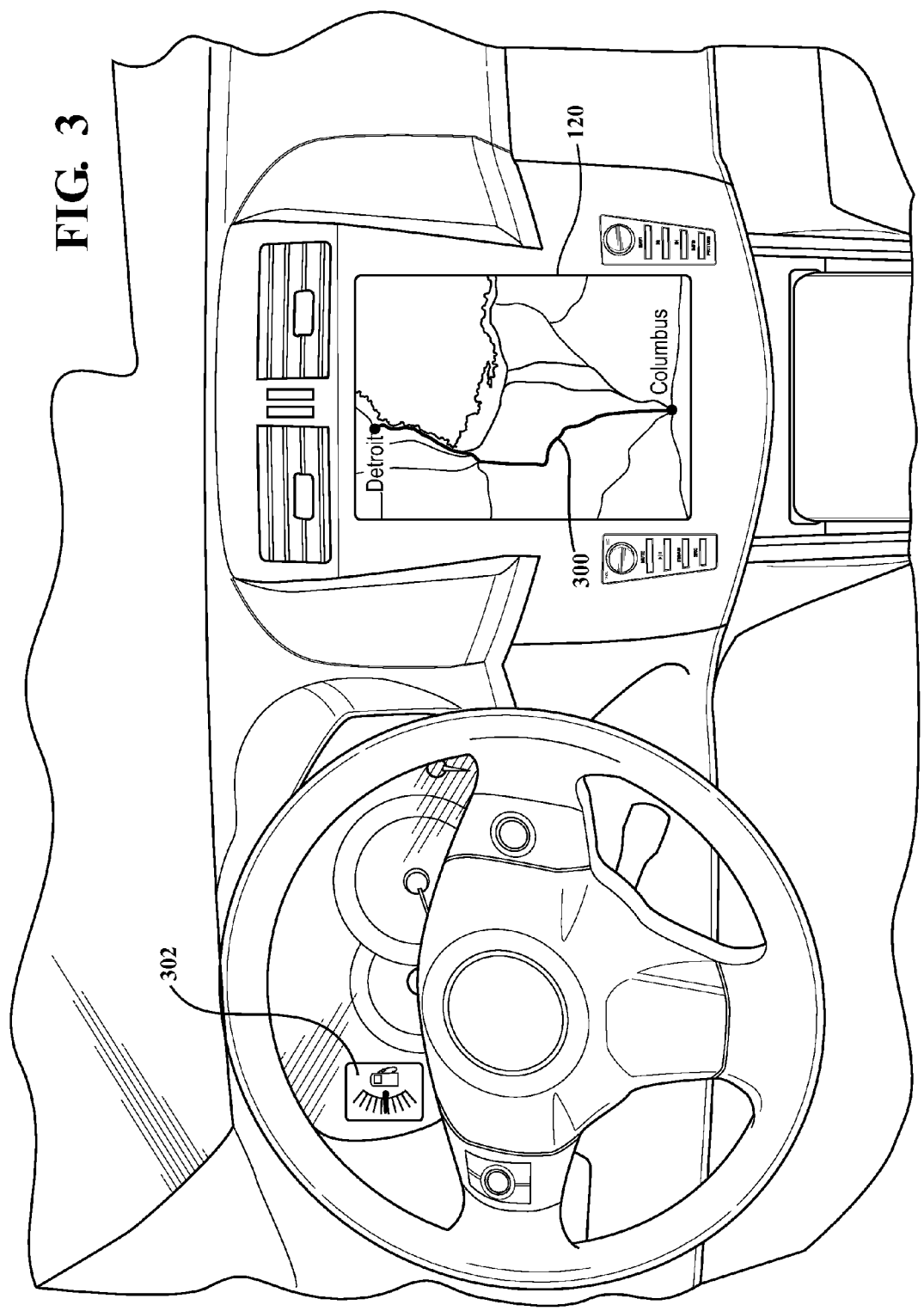
FIG. 3 shows an example planned vehicle path displayed to a driver.

FIG. 3 shows an example planned vehicle path 300 displayed to a driver of the autonomous vehicle 200 on the vehicle interface 120. In this example, the vehicle interface 120 is a navigation display screen within the interior of the autonomous vehicle 200. The planned vehicle path 300, for example, as input by the driver or suggested by the automated driving system, routes the autonomous vehicle 200 from Columbus, Ohio to Detroit, Mich. The automated driving system can be configured to determine a required fuel level to complete the planned vehicle path 300, calculated, for example, based on fuel efficiency of the autonomous vehicle 200 and the distance to be traveled along the planned vehicle path 300. In this example, the required fuel level is the amount of fuel that would be necessary for the autonomous vehicle 200 to travel from Columbus, Ohio to Detroit, Mich.

The automated driving system can also be configured to determine the current fuel level of the autonomous vehicle 200. The dashboard of the autonomous vehicle 200 can, for example, include a fuel level display 302, the fuel level display 302 indicating the current fuel level of the autonomous vehicle 200 as captured by one or more of the sensors 116 in communication with a fuel system in the autonomous vehicle 200. In this example, the autonomous vehicle 200 includes approximately half a tank of fuel as shown by the half-full indicator on the fuel level display 302. Though this example refers to traditional vehicular fuels, e.g. diesel or gasoline, the autonomous vehicle 200 can alternatively or additionally be powered by any energy source, such as batteries, compressed gas, etc. References to fuel levels and fuel systems throughout this disclosure can thus refer to any energy source in use by the autonomous vehicle 200.

The automated driving system can also be configured to compare the current fuel level to the required fuel level for the planned vehicle path 300. Continuing the previous example, the distance between Columbus, Ohio and Detroit, Mich. is approximately 200 miles and the current fuel level is approximately one-half tank of fuel. If the autonomous vehicle 200 has a large fuel tank and/or high fuel efficiency, the current fuel level can be determined to be above the required fuel level, and the autonomous vehicle 200 can continue along the planned vehicle path 300. If the autonomous vehicle 200 does not, for example, have a large fuel tank or high fuel efficiency, the automated driving system can determine that the current fuel level is below the required fuel level to complete the planned vehicle path 300. When the current fuel level is below the required fuel level to complete the planned vehicle path 300, the autonomous vehicle can identify one or more refueling stations for use by the autonomous vehicle 200 as further described in respect to FIG. 4.

Figure 4:
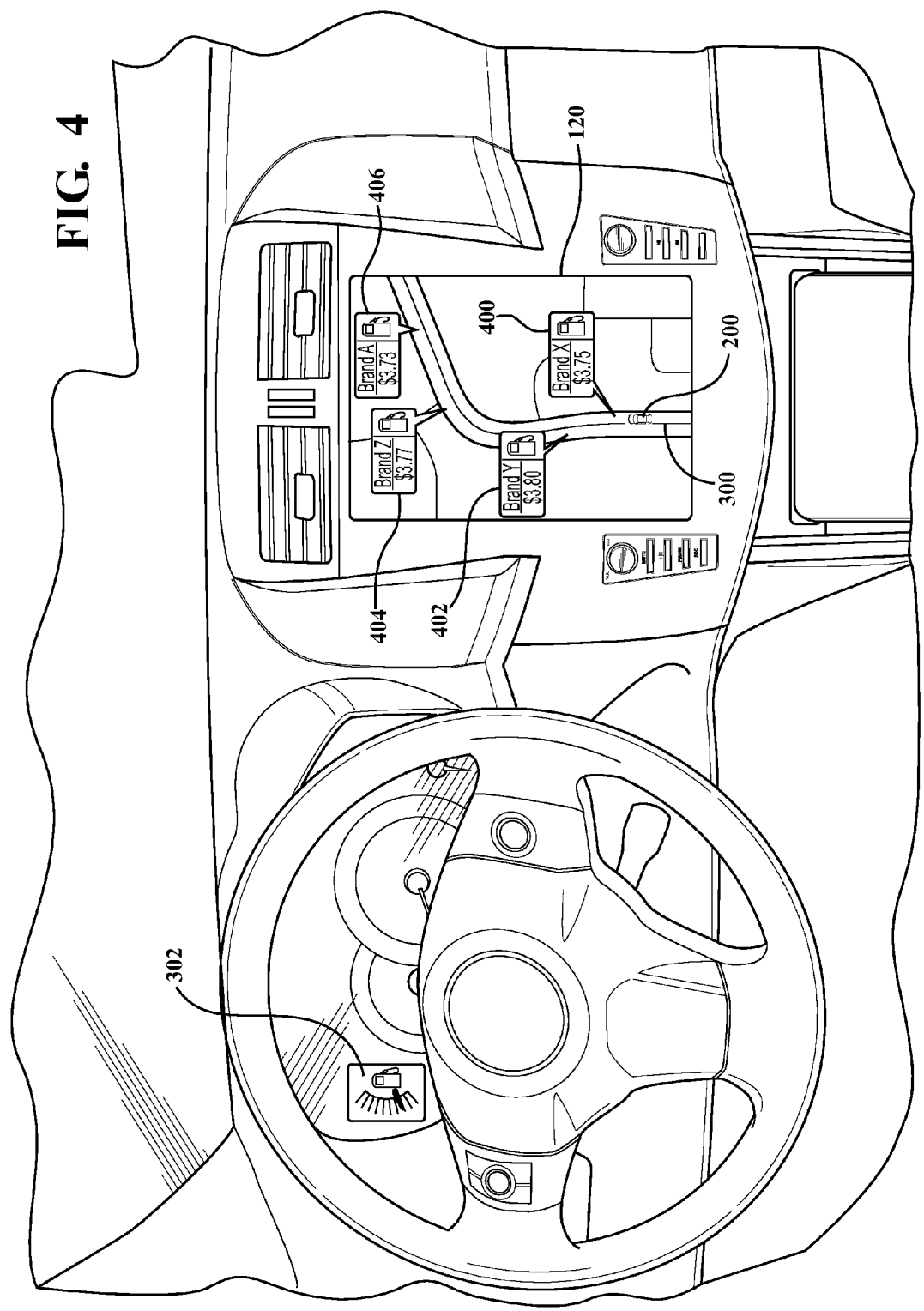
FIG. 4 shows example refueling stations icons for selection by the driver proximate to the planned vehicle path of FIG. 3.

FIG. 4 shows example refueling station icons 400, 402, 404, 406 for selection by the driver proximate to the planned vehicle path 300 of FIG. 3 as displayed on the vehicle interface 120. If the automated driving system determines that the current fuel level is below the required fuel level to complete the planned vehicle path 300, one or more refueling stations can be identified. The refueling stations can be identified based on, for example, the current fuel level of the vehicle (e.g., when the current fuel level reaches a predetermined level), the location of the refueling stations in reference to the planned vehicle path 300, or on driver preferences including brand preferences (e.g., brands for which the driver has a membership discount), proximity preferences (e.g., within a specified distance of the planned vehicle path 300), and price preferences (e.g., lowest price).

The automated driving system can also be configured to receive information, e.g. location information and fuel type information, related to driver-identified or driver-preferred refueling stations directly from the driver. For example, the driver can identify his home address as including a recharging station, identify various refueling stations not present in remote databases, such as refueling or recharging stations present at a work location of the driver, or otherwise input information regarding preferred refueling stations that can impact the selection of refueling stations made by the automated driving system. Any additional refueling station information input by the driver can improve the accuracy the refueling station selections offered by the automated driving system.

In one example, the automated driving system can identify a single refueling station, one that best minimizes the distance and price and most closely matches the preferences of the driver. In another example where the autonomous vehicle 200 is an electric vehicle, if the current fuel level, that is, the current charge level, is below the required level to complete the planned vehicle path 300, the automated driving system can send an indication to the driver that additional charging is necessary at the current location of the autonomous vehicle 200.

Once one or more refueling stations have been identified, the automated driving system can send an indication to the driver requesting selection of one of the identified refueling stations. The indication, can, for example, be in the form of the refueling station icons 400, 402, 404, 406 displayed to the driver on the vehicle interface 120, but other indications, such as audio-based indications, are also possible. Similarly, the indication can be sent to the driver either before the autonomous vehicle 200 travels the planned vehicle path 300 or while the autonomous vehicle 200 is traveling the planned vehicle path 300. In the example of FIG. 4, the fuel level display 302 shows that the autonomous vehicle 200 has approximately one-quarter tank of fuel at the current location along the planned vehicle path 300. This one-quarter tank fuel level can be set as a threshold for sending the indication to the driver requesting selection of an identified refueling station.

Once the indication has been sent to the driver to select a refueling station, the driver can choose one of the refueling stations suggested by the automated driving system, and the planned vehicle path 300 can be updated to include a stop at the selected refueling station. However, if a refueling station selection is not received from the driver, the automated driving system can determine a critical fuel level. The critical fuel level can be based on, for example, the current fuel level, the planned vehicle path, and the location of the refueling stations proximate to the planned vehicle path. The critical fuel level can be the fuel level below which the autonomous vehicle 200 will no longer continue the planned vehicle path 300, but will instead send a command to one or more vehicle systems 118, such as the steering system or the braking system, to drive the autonomous vehicle 200 to one of the proximate refueling stations.

By determining a critical fuel level and sending the autonomous vehicle 200 to a refueling station once the current fuel level falls below the critical fuel level, the autonomous vehicle 200 avoids a situation where operation is no longer possible due to lack of fuel. Though the driver of the autonomous vehicle 200 is given the chance to select a refueling station, if the driver is not paying attention to the indication requesting selection, or if the driver chooses to ignore the need for fuel, the autonomous vehicle 200 can continue operation because it will automatically navigate to a refueling station before all fuel is expended. In the example where no refueling station selection is received from the driver, but the current fuel level is not yet below the critical fuel level, the autonomous vehicle 200 continues along the planned vehicle path 300 until the current level falls below the critical fuel level.

Figure 5:
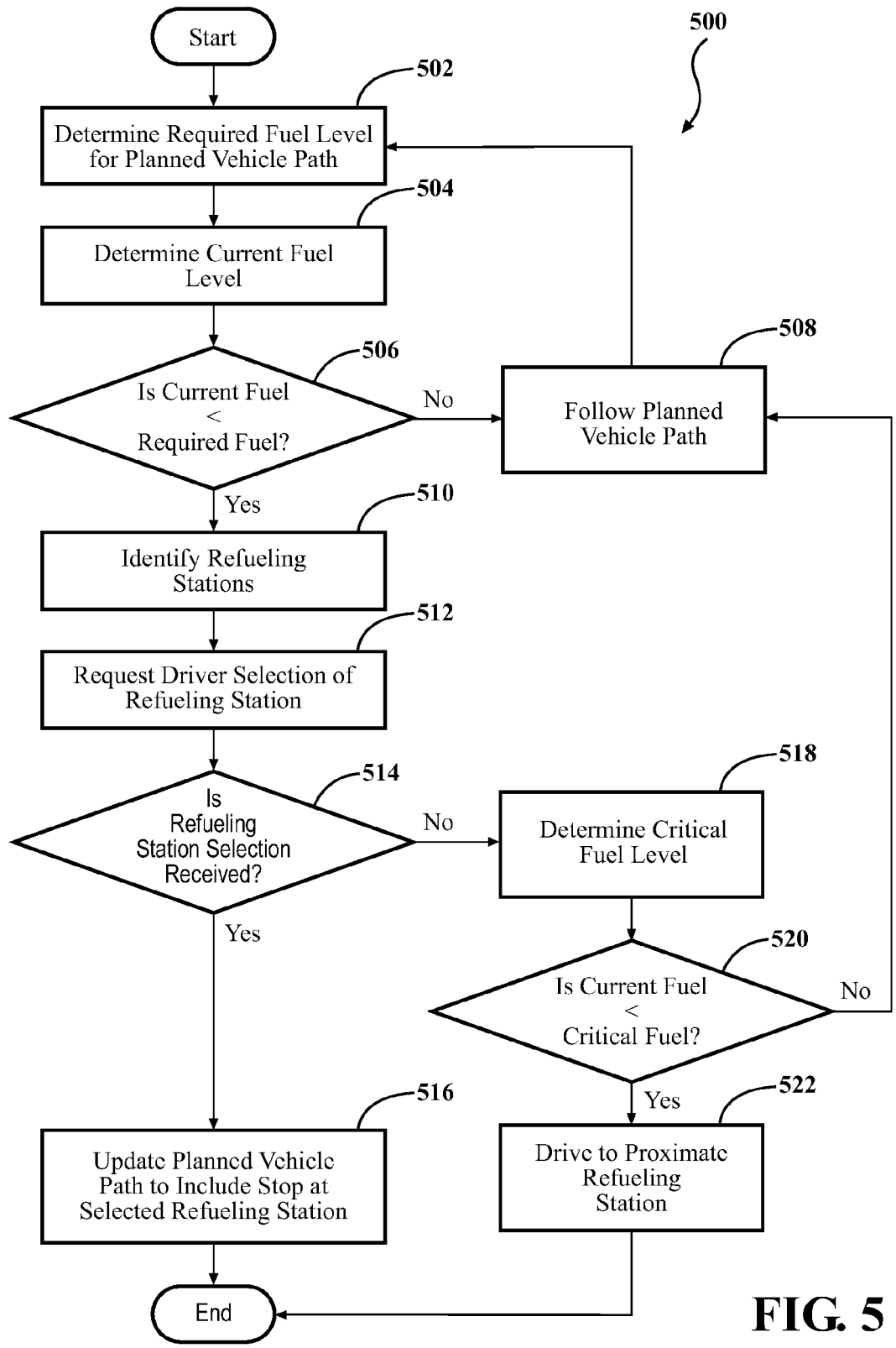
FIG. 5 is a logic flowchart of a refueling locator process performed by the automated driving system.

FIG. 5 is a logic flowchart of a refueling locator process 500 performed by the automated driving system. In step 502, the automated driving system can determine a required fuel level to complete a planned vehicle path, such as the planned vehicle path 300 shown in FIGS. 3 and 4. The planned vehicle path can be based on at least one driver input, such as a route selection through a navigation system or an audible command provided to the autonomous vehicle 200 from the driver. The required fuel level can be calculated based on the planned vehicle path and fuel efficiency characteristics of the autonomous vehicle 200.

In step 504, the automated driving system can determine a current fuel level for the autonomous vehicle 200, for example, based on input from one or more sensors 116, such as a sensor 116 in communication with a fuel system of the vehicle. At decision block 506, the automated driving system can determine whether the current fuel level is below the required fuel level, that is, whether there is insufficient fuel for the autonomous vehicle 200 to complete the planned vehicle path. If the current fuel level is not below the required fuel level, the process 500 continues to step 508, and the autonomous vehicle 200 continues to follow the planned vehicle path and returns to step 502 to cycle through the process 500 again.

If the current fuel level is below the required fuel level, the process 500 continues to step 510, and the automated driving system identifies one or more refueling stations. The refueling stations can be identified, for example, based on the current fuel level, the planned vehicle path, and/or driver preferences for brand, price, or location, as described above. After identifying the refueling stations, the process 500 continues to step 512, and the automated driving system can send an indication to the driver of the autonomous vehicle 200 to request selection of one of the identified refueling stations. The indication can be visual, using, for example, the refueling station icons 400, 402, 404, 406 shown in FIG. 4 on map of the planned vehicle path 300.

After sending the indication to the driver to select a refueling station, the process 500 continues to decision block 514 where the automated driving system determines whether a refueling station selection is received from the driver. If a refueling station selection is received from the driver, the process 500 continues to step 516, and the planned vehicle path is updated to include a stop at the selected refueling station. After step 516, the process 500 ends. If a refueling station selection is not received from the driver, for example, if the driver does not respond in a predetermined time, or if the driver ignores the request, the process 500 continues to step 518.

In step 518, the automated driving system can determine a critical fuel level for the autonomous vehicle 200. The critical fuel level, can, for example, be the fuel level below which the autonomous vehicle 200 would be at risk of running out of fuel before a refueling station could be added to the planned vehicle path. The critical fuel level can be calculated based on the current fuel level, the planned vehicle path, and the location of one or more refueling stations proximate to the planned vehicle path. After determination of the critical fuel level, the process 500 continues to decision block 520 where the automated driving system determines whether the current fuel level is below the critical fuel level.

If the current fuel level is not below the critical fuel level, the process 500 returns to step 508, and the autonomous vehicle 200 continues to follow the planned vehicle path. However, if the current fuel level is below the critical fuel level, the process 500 continues to step 522 where the automated driving system sends a command to one or more of the vehicle systems to drive the autonomous vehicle 200 to a proximate refueling station. After step 522, the process 500 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. An automated driving system, comprising:
   one or more sensors disposed on an autonomous vehicle; and
   a computing device in communication with the one or more sensors, comprising:
     one or more processors for controlling operations of the computing device; and
     a memory for storing data and program instructions used by the one or more processors, wherein the one or more processors are configured to execute instructions stored in the memory to:
       determine a required fuel level to complete a planned vehicle path;
       determine, based on input from the one or more sensors, a current fuel level for the autonomous vehicle;
       if the current fuel level is below the required fuel level, identify one or more refueling stations and send an indication to a driver of the autonomous vehicle requesting selection of one of the identified refueling stations;
       if a refueling station selection is not received from the driver, determine a critical fuel level; and
       if the current fuel level is below the critical fuel level, send a command to one or more vehicles systems to drive the autonomous vehicle to a proximate refueling station.

2. The automated driving system of claim 1, wherein the one or more processors are further configured to:
   calculate the planned vehicle path based on at least one driver input.

3. The automated driving system of claim 1, wherein the one or more processors are further configured to:
   if the current fuel level is not below the required fuel level, continue along the planned vehicle path.

4. The automated driving system of claim 1, wherein the one or more processors are further configured to:
   if a refueling station selection is received from the driver, update the planned vehicle path to include a stop at the selected refueling station.

5. The automated driving system of claim 1, wherein identifying the one or more refueling stations is based on at least one of the current fuel level, the planned vehicle path, and driver preferences.

6. The automated driving system of claim 5, wherein the driver preferences include at least one of a brand preference, a proximity preference, and a price preference.

7. The automated driving system of claim 1, wherein determining the critical fuel level is based on the current fuel level, the planned vehicle path, and a location of one or more refueling stations proximate to the planned vehicle path.

8. The automated driving system of claim 1, wherein the one or more processors are further configured to:
   if the current fuel level is not below the critical fuel level, continue along the planned vehicle path.

9. A computer-implemented method of automated driving, comprising:
   determining a required fuel level to complete a planned vehicle path;
   determining, based on input from one or more sensors disposed on an autonomous vehicle, a current fuel level for the autonomous vehicle;
   if the current fuel level is below the required fuel level, identifying one or more refueling stations and sending an indication to a driver of the autonomous vehicle requesting selection of one of the identified refueling stations;
   if a refueling station selection is not received from the driver, determining a critical fuel level; and
   if the current fuel level falls below the critical fuel level, sending a command to one or more vehicles systems to drive the autonomous vehicle to a proximate refueling station.

10. The method of claim 9, further comprising:
    if the current fuel level is not below the required fuel level, continuing along the planned vehicle path.

11. The method of claim 9, further comprising:
    if a refueling station selection is received from the driver, updating the planned vehicle path to include a stop at the selected refueling station.

12. The method of claim 9, wherein identifying the one or more refueling stations is based on at least one of the current fuel level, the planned vehicle path, and driver preferences.

13. The method of claim 12, wherein the driver preferences include at least one of a brand preference, a proximity preference, and a price preference.

14. The method of claim 9, wherein determining the critical fuel level is based on the current fuel level, the planned vehicle path, and a location of one or more refueling stations proximate to the planned vehicle path.

15. A computing device, comprising:
    one or more processors for controlling operations of the computing device; and a memory for storing data and program instructions used by the one or more processors, wherein the one or more processors are configured to execute instructions stored in the memory to:
  determine a required fuel level to complete a planned vehicle path;
  determine, based on input from one or more sensors disposed on an autonomous vehicle, a current fuel level for the autonomous vehicle;
  if the current fuel level is below the required fuel level, identify one or more refueling stations and send an indication to a driver of the autonomous vehicle requesting selection of one of the identified refueling stations;
  if a refueling station selection is received from the driver, update the planned vehicle path to include a stop at the selected refueling station;
  if a refueling station selection is not received from the driver, determine a critical fuel level; and
  if the current fuel level falls below the critical fuel level, send a command to one or more vehicles systems to drive the autonomous vehicle to a proximate refueling station.

16. The computing device of claim 15, wherein the one or more processors are further configured to:
  if the current fuel level is not below the required fuel level, continue along the planned vehicle path.

17. The computing device of claim 15, wherein identifying the one or more refueling stations is based on at least one of the current fuel level, the planned vehicle path, and driver preferences.

18. The computing device of claim 17, wherein the driver preferences include at least one of a brand preference, a proximity preference, and a price preference.

19. The computing device of claim 15, wherein determining the critical fuel level is based on the current fuel level, the planned vehicle path, and a location of one or more refueling stations proximate to the planned vehicle path.

* * * * *